3,130,071
Patented Apr. 21, 1964

3,130,071
PROCESS FOR INCREASING THE SCRATCH RESISTANCE OF GLASS BY TREATMENT WITH TITANIUM LACTATE POLYMER

William H. Brockett, Kennett Square, Pa., and Robert Harold Detire, Brandywine Hundred, and Charles Louis Gray, Jr., Wilmington, Del., assignors to E. I. du Pont de Nemours and Company, Wilmington, Del., a corporation of Delaware
No Drawing. Filed Mar. 23, 1961, Ser. No. 97,757
5 Claims. (Cl. 117—124)

This invention relates to an improved process for increasing the scratch resistance of glass bodies.

The problem and importance of scratch resistance in glass are discussed in detail by Deyrup in U.S. Patent 2,831,780. It is a practical industrial problem and relates to such items as the weakening of glass bottles by rubbing against each other in transit, the marring of window glass through scratches by impinging dust or glass fragments, and the weakening of textile glass fibers by mutual abrasion.

In said patent, Deyrup offers a method for overcoming this deficiency of glass by treating the glass with the vapors of a metallo-organic compound at a temperature between the lowest annealing temperature of glass and the temperature at which excessive deformation occurs. Such temperature must also be sufficiently high to cause the pyrolysis of the metallo-organic compound to form a metal oxide, which melts or sublimes above the melting point of silicon dioxide 1710° C. The oxide thus deposited produces an adherent, refractory coating, which substantially increases the scratch resistance of the surface and therefore the practical strength of the glass.

Deyrup describes two methods for carrying out his procedure, both of which however require application of the metallo-organic compound, a titanate ester for instance, in vapor form. Such a process has inherent objections from the viewpoint of large scale, industrial practice, such as the need for feeding a stream of inert gas containing the vaporized titanate into a heated annealing furnace, which is a process rather difficult to control as to temperature, uniformity of feed-mixture and uniformity of coating. Also, it is rather difficult to maintain the necessary anhydrous atmosphere within the heated chamber and, at the same time, introduce and remove glass objects from the oven. The process is also wasteful, since much of the titanate material fed into the furnace coating chamber finds its way to the walls of the chamber or is hydrolyzed to a useless form.

In processes wherein various articles, including glass, have been coated with titanates for other purposes, for instance to deposit an adhesive layer on the article, it has been suggested to apply the titanate in the form of a solution thereof in an organic solvent. Such processes have the disadvantage of requiring the use of vaporizable, and often highly flammable, organic solvents. Also, it is difficult to confine absolutely the vapors of the solvent, and the spreading fumes constitute a constant health hazard to the workers. Finally, some titanate esters hydrolyze readily, so unless the temperature and moisture environments of the treated glass are carefully controlled, the scratch resistance of the resulting article may be unsatisfactory.

Accordingly, it is an object of this invention to provide a process for improving the scratch resistance of glass, which shall be characterized by simplicity and general economy, uniformity of the coating applied, absence of fire and health hazards, assurance against premature hydrolysis of the titanate, and other valuable, practical advantages which will appear more fully as the description proceeds.

Now, according to this invention, we select for the aforementioned treatment a water-soluble organic titanate which is characterized by stability against hydrolysis in the presence of water at ordinary temperature, and we apply said titanate to the glass from an aqueous solution, at room temperature, prior to annealing. Selection of an aqueous solution, not only eliminates fire hazards and health hazards, but also minimizes waste and enables us to apply to the glass article a coating of any desired ultimate thickness by calculating in advance the requisite concentration of the titanate in the aqueous solution.

Following application of the solution in any convenient manner, as by rinsing, immersion or spraying, the glass body may be allowed to dry in open air or may be transferred directly into the annealing furnace, where it is heated, as in the Deyrup procedure, at or near the annealing temperature, but not sufficiently high to deform perceptibly the shape of the glass article. In the case of bottle glass, the heating temperature may be in the range of 510° to 670° C. With other types of glass, different temperature ranges will be selected, but these are well within the knowledge and understanding of persons skilled in this art. Thus, soft soda glass has an annealing temperature below 400° C.; borosilicate glass, near 580° C. The length of dwell in the annealing furnace will likewise follow customary practice in annealing glass, and may be of the order of a few hours.

Following annealing (or rather as part thereof) the glass is gradually cooled within the furnace atmosphere, as is customary in glass practice. But as a special further feature of this invention, the glass, following cooling, is allowed to stand in the open atmosphere for a period of at least 30 minutes (without any upper limit). This final step, to which may be designated the capping step, has an important influence on the quality of the scratch resistance protection imparted to the article. And while standing for at least 30 minutes in open air before use is apt to occur automatically with almost any article, this step takes on a positive aspect when one considers belt line production of glass articles such as milk bottles. According to our invention, we recommend holding the bottles at rest, in open air, for at least 30 minutes, before they are allowed to proceed on the conveyor belt, in order to perfect their scratch resistance before they are exposed to the risk of rubbing against each other while in motion.

As to the chemical nature of the titanate which is to be selected according to this invention, it may be defined generally as a lactic acid complex of titanium which is applied to the glass from an acid or essentially neutral aqueous solution, that is at a pH of 6 to 7, although with special precautions, the pH may be as high as 8.

The lactic acid complexes of titanium useful in this invention may be prepared by several methods. One method is by reacting a tetraalkyl titanate (of 3 to 8 C-atoms per alkyl group), preferably tetraisopropyl or tetrabutyl titanate, with an aqueous solution of lactic acid of 50 to 85% strength. The reaction may be carried out with or without a solvent. Solvents which may be used are hydrocarbons, such as hexane or heptane, or ketones, such as acetone. A typical preparation is described in Example 1 below. Another method is to react titanyl sulfate with lactic acid as described by Russell in U.S. Patent No. 2,926,183. Chemical evidence indicates that these methods produce complexes of essentially identical composition. The structure of each product is rather indefinite, and precise formulation thereof is not practically possible. It appears that the products of both methods possess a polymeric structure, which may be considered as resulting from the polymerization of units having the formula $$(C_3H_5O_3)_xTi(OH)_{4-x}$$

wherein $C_3H_5O_3$ is the lactate radical

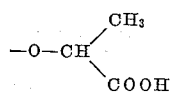

and $x$ is an integer from 1 to 3 inclusive. It is conceivable that when dissolved in water, the same unit is regenerated in solution. It is to be understood, however, that the above theory is not intended as a limitation upon our invention.

The titanium lactate complexes described above dissolve in water to form acidic solutions. However, to prevent corrosion to metallic equipment, these aqueous solutions are preferably neutralized with ammonia, sodium or potassium bicarbonate or aluminum hydroxide, to bring up to the pH to a value of 6 to 7. With special care, a pH as high as 8 may be tolerated, but higher basicity than that is to be avoided.

Aqueous solutions of 0.5 to 5% by weight of the titanium lactate complex are preferred in this invention. To facilitate wetting of the glass, wetting agents may be added, for which purpose nonionic organic wetting agents are preferred since they are less prone to react with the titanium lactate complex. During the heat treatment, the wetting agents are decomposed and combusted leaving behind no residue to discolor or otherwise affect the treated glass surface. Examples of conveniently available nonionic watting agents, useful for this invention are the polyoxyethylene compounds of structure $$RO(CH_2CH_2O)_nH$$

where R is an aliphatic hydrocarbon or alkaryl radical or an aliphatic acyl radical, as typified, respectively, by the condensation products of 10 to 20 moles of ethylene oxide with oleyl alcohol, isooctyl phenol, dodecyl phenol or stearic acid.

Anionic surface-active agents may also be used for this purpose, convenient examples being the sodium salts of higher alcohol sulfates (i.e. having from 10 to 16 C-atoms), sodium alkyl sulfonates, sodium alkyl-naphthalene sulfonates and sodium long-chain ($C_{10}$ to $C_{20}$) hydrocarbon sulfonates.

Without limiting this invention, the following examples are given to illustrate our preferred mode of operation. Parts mentioned are by weight.

EXAMPLE 1

Part A

*Preparation of the titanate complex.*—A solution of tetraisopropyl titanate is prepared in an air tight kettle by adding 71 parts of tetraisopropyl titanate to 142 parts of anhydrous heptane under a dry nitrogen blanket. Then 56.25 parts of 80% lactic acid (20% water) is added with stirring to the heptane solution with agitation over a period of about 15 minutes while holding the temperature below 45° C. with external cooling. After one hour's further agitation, the resulting slurry is separated by filtration, giving 90 parts of white solid. The product is then dried in a vacuum tray oven at less than 40° C. The yield is at least 90%.

Analysis: $TiO_2$, 33.34, 33.40%; C, 26.69, 26.26%; H, 5.09, 5.04%.

The same procedure can be used with other aliphatic hydrocarbon solvents such as hexane, but heptane is the most convenient so far as cost, fire hazard and the like are concerned.

Part B

*Treatment of glass.*—An 0.5% by weight solution of the titanium lactate complex described in Example 1 is prepared in water containing 0.25% polyoxyethylene stearate. The solution is neutralized to pH 6.8–7.0 with ammonia. The resulting solution is fog sprayed on glass bottles with an apparatus which wets the entire outer surface on a continuous moving belt apparatus which then carries the bottles into a commercial lehr, where they are slowly heated to 650° C. and then slowly cooled to room temperature. Immediately after the bottles have cooled to room temperature, they are allowed to stand for about 30 minutes after which the bottles are scratch resistant.

Scratch resistance is demonstrated by rubbing two bottles together, which results in no scratches when the bottles have been treated according to this example. Rubbing two identical untreated bottles together results in scratching of both bottles.

Repeating the above procedure, except for using a 1.0% solution of the titanium lactate complex, gives essentially identical results. Substituting the titanium lactate complexes described by Shacklett or Russell, gives equivalent results.

EXAMPLE 2

A concentrated aqueous solution of the titanium lactate complex obtained in part A of Example 1 is treated with an excess of freshly precipitated aluminum hydroxide. After agitating until no further aluminum hydroxide appears to dissolve, the excess is removed by filtration. The filtrate is essentially neutral, and evaporation thereof gives a water soluble and water stable titanium aluminum lactate complex. The latter is now made into a 5% solution in water containing about 0.12% of a polyoxyethylated oleyl alcohol containing about twenty ethylene oxide units. When this solution is applied to glass as in part B of Example 1, essentially the same results are obtained.

EXAMPLE 3

The titanium lactate complex obtained in part A of Example 1 is dissolved in water containing 0.37% of the same polyoxyethylated oleyl alcohol as in Example 2, to form a 3% solution of the complex by weight. Without neutralization, this solution is applied to glass as in part B of Example 1. Essentially the same results as in Example 1 are obtained insofar as the glass is concerned. The solution, however, is somewhat corrosive to metal equipment employed in the process.

As already mentioned, the scratch resistance achieved in the above examples can be demonstrated by rubbing two bottles together and examining them with the naked eye or with a magnifying glass for scratches.

On a laboratory scale, a convenient method for testing the scratch resistance imparted to glass by any given titanate ester composition is as follows:

A drop of the titanate ester solution to be tested is placed on a clean glass microscope slide, and is spread out (excess solution being removed) by the aid of another glass slide to form a very thin film that covers just about one half of the first slide. The other half then remains as a control. The slide is then dried, annealed, cooled and allowed to stand in open air for 30 minutes or more, as in the example above.

When the edge of an untreated slide is then drawn over the treated slide lengthwise, starting from the untreated half, a scratch is produced which terminates abruptly as the boundary of the treated portion is crossed.

It will be understood that the details of the procedures above set forth may be varied widely within the skill of those engaged in this art. The following additional details will assist in the understanding and control of the invention.

The thickness of the eventual coating can be controlled by selecting the proper concentration for the applied aqueous solution. This selection can be effected on the basis of an experience chart which correlates the thickness of the final film on the glass in a few cases to the concentrations of the solutions applied in the respective cases. The needed concentration of the solution for any other specified eventual thickness of coating may then be calculated by interpolation or extrapolation in the experience chart.

Desirable thicknesses in the ultimate dry coating are from about 5 to about 100 millimicrons. When the coating exceeds 100 millimicrons in thickness, the scratch resistance begins to drop off.

The thickness of the final coating may be gauged or judged by various means. Thus, with ordinary white light, a coating thicker than 100 millimicrons will show colored diffraction effects.

The nature of the coating and the cause of the scratch resistance observed are only partially understood. The surface coatings produced are known to be amorphous when less than 100 millimicrons thick; that is, they have no regular crystalline characteristics. On the other hand, coatings thicker than 100 millimicrons start to show a crystalline X-ray pattern, which is characteristic of the titanium dioxide mineral anatase.

The method of bonding to the glass surface is not known but is surmised to involve Ti—O—Si bonding.

Glass treated according to this invention is not different in appearance from untreated glass of the same type (provided the coating thickness is kept below 100 millimicrons as above recommended). But the two can be distinguished by special physical tests. Thus, the coefficient of friction of untreated glass is about 0.8 to 0.9, while that of the treated glass has been found to be about 0.17 to 0.25.

We claim as our invention:

1. A process for increasing the scratch resistance of a glass body in the belt line production of glass articles which comprises wetting the surface of said body with a thin layer of an essentially neutral aqueous solutions of a water-soluble water-stable titanium lactate polymer as obtained by reaction a tetraalkyl titanate with aqueous lactic acid, subjecting the wetted glass to heating at a temperature sufficient to anneal the glass but below that at which perceptible deformation of the shape of the glass body steps in, cooling the glass body and immediately after cooling said glass body allowing the glass body to stand at rest in open air for not less than 30 minutes before exposing the same to handling wherein rubbing of the glass body against other glass bodies is likely to occur.

2. A process as in claim 1, wherein the aqueous solution of said titanium lactate complex is neutralized with an inorganic base to a pH not exceeding 8.

3. A process as in claim 1, wherein the aqueous solution of said titanium lactate complex is neutralized with an inorganic base to a pH of 6 to 7.

4. A process as in claim 1, wherein the aqueous solution of said titanium lactate complex contains further a non-cationic organic surface active agent.

5. A process as in claim 1, wherein the temperature in the heating step is between 510° and 670° C.

References Cited in the file of this patent

UNITED STATES PATENTS

| | | |
|---|---|---|
| 760,319 | Dreher | May 17, 1904 |
| 2,584,763 | Waggoner | Feb. 5, 1952 |
| 2,724,658 | Lytle | Nov. 22, 1955 |
| 2,727,829 | Chertkof | Dec. 20, 1955 |
| 2,768,909 | Haslam | Oct. 30, 1956 |
| 2,813,045 | Abbott | Nov. 12, 1957 |
| 2,831,780 | Deyrup | Apr. 22, 1958 |
| 2,898,356 | Russell | Aug. 4, 1959 |
| 2,926,183 | Russell | Feb. 23, 1960 |
| 2,938,812 | Marzocchi et al. | May 31, 1960 |
| 2,941,903 | Winston | June 21, 1960 |
| 2,953,474 | Wheeler | Sept. 20, 1960 |
| 3,002,854 | Brill | Oct. 3, 1961 |
| 3,004,863 | Gray et al. | Oct. 17, 1961 |
| 3,004,875 | Lytle | Oct. 17, 1961 |
| 3,019,135 | Orr | Jan. 30, 1962 |
| 3,051,593 | Gray et al. | Aug. 28, 1962 |

FOREIGN PATENTS

| | | |
|---|---|---|
| 811,425 | Great Britain | Apr. 1, 1959 |
| 811,426 | Great Britain | Apr. 8, 1959 |